INVENTORS
Carroll J. Whitfield
Marvin L. Nafziger

Newton, Hopkins,
Jones & Ormsby
ATTORNEYS

INVENTORS
Carroll J. Whitfield
Marvin L. Nafziger
Newton, Hopkins,
Jones & Ormsby
ATTORNEYS United States Patent Office 3,418,790
Patented Dec. 31, 1968

3,418,790
ROTARY CUTTERS WITH EQUAL
ANGULAR VELOCITIES
Carroll J. Whitfield, Albany, and Marvin L. Nafziger,
Baconton, Ga., assignors to Lilliston Implement Company, Albany, Ga., a corporation of Georgia
Filed May 4, 1966, Ser. No. 547,549
10 Claims. (Cl. 56—6)

This invention relates generally to rotary cutters and, more particularly to a rotary cutter having a linkage mechanism for pivotally connecting a pair of cutter sections in a predetermined manner.

Previous rotary cutters generally have had a plurality of cutter units or sections, each having a cutting blade associated therewith, the cutter sections being pivotally connected to each other in order to facilitate the cutting of foliage on irregular terrain. The cutting blades of these previous rotary cutters have generally been driven by a vehicle such as a farm tractor which tows the rotary cutter. The cutter blades are usually driven by a primary drive shaft connecting the power take-off of the vehicle to a central transmission carried on the rotary cutter and the output shafts from the central transmission drive the cutting blades of the cutter sections through secondary drive shafts connecting the transmission output shafts to drive units carrying the cutter blades. The secondary drive shafts are connected to the output shafts through universal joints to permit the cutter sections to pivot with respect to each other while the cutter blades are being driven.

As these rotary cutters are towed over irregular or unlevel terrain, the cutter sections pivot with respect to each other in order that the swath cut by the cutting blades substantially conforms to the terrain. As a result of the cutter sections pivoting with respect to each other, the secondary drive shafts pivot at the universal joints with respect to the output shafts of the central transmission. Since it is generally known that operating universal joints under conditions where the shafts of the joint are not aligned (i.e., the shaft angle is not 0°) causes the output shaft of the joint to surge or rotate at fluctuating speeds, it can easily be seen that the rotational speed of the cutting blades of the cutter sections vary with respect to each other although the output shafts of the central transmission are rotating at a constant speed. The surging of the cutter blades prevents the blades from being driven in a timed, overlapping arrangement and the rotary cutter stresses the drive train causing damage to the universal bearing joints of the cutter.

The invention disclosed herein overcomes these and other problems associated with prior art by constructing a rotary cutter with adjacent cutter sections, a central transmission disposed between the cutter sections, secondary drive shafts connected by universal joints to the transmission output shafts, the secondary drive shafts each being connected by universal joints to the input shaft of each cutter unit. Means are provided for maintaining the output shafts of the transmission on the rotary cutter and the secondary drive shafts to each side of the transmission at equal angles and maintaining the secondary drive shafts of each cutter section and the cutter input shafts at equal angles, whereby the sum of the angles formed between the output shaft and the secondary drive shaft and between the secondary drive shaft and the cutter input shaft on one cutter section is equal to the sum of the angles formed between the corresponding elements on the opposite cutter section. Since corresponding angles in the drive train on each side of the transmission are maintained at equal angles, any surging in one drive train caused by the angles therein is duplicated in the other drive train. Thus, while the blades driven by the drive train continue to rotate at varying angular velocities, the velocities of the blades will be substantially equal to each other at any given instant. This arrangement serves to minimize the normally encountered problems of wear and vibration as a result of unequal speed variations between the cutting blades and associated drive train.

Thus, it is an object of this invention to provide a rotary cutter having adjacent cutter sections pivotally connected to each other whereby the cutter blades of the cutter sections are driven at the same angular velocity.

Another object of the invention is to provide a rotary cutter having adjacent cutter sections each driven by a drive train extending from a central transmission, wherein the variation in angular velocity of one drive train is duplicated by the opposite drive train.

Another object of this invention is to provide a rotary cutter with a power train constructed and arranged with the rotary cutter to encounter a minimum of vibrations and torque forces.

Another object of this invention is to provide a rotary cutter having adjacent cutter sections pivotally connected to a central support beam wherein said cutter sections are maintained at equal angles about said central support beam.

Another object of this invention is to provide a rotary cutter that is simple in construction, efficient and smooth in operation, durable and long lasting and well designed to meet the economics of manufacture.

These and other objects, features and advantages of the invention will become more clearly understood upon consideration of the following specification and accompanying drawings wherein like characters of reference designate corresponding parts throughout the several views, in which.

These figures and the following detailed description disclose one specific embodiment of the invention; however, it is to be understood that the inventive concept is not limited thereto since the invention may be embodied in other equivalent forms.

Figure 1:
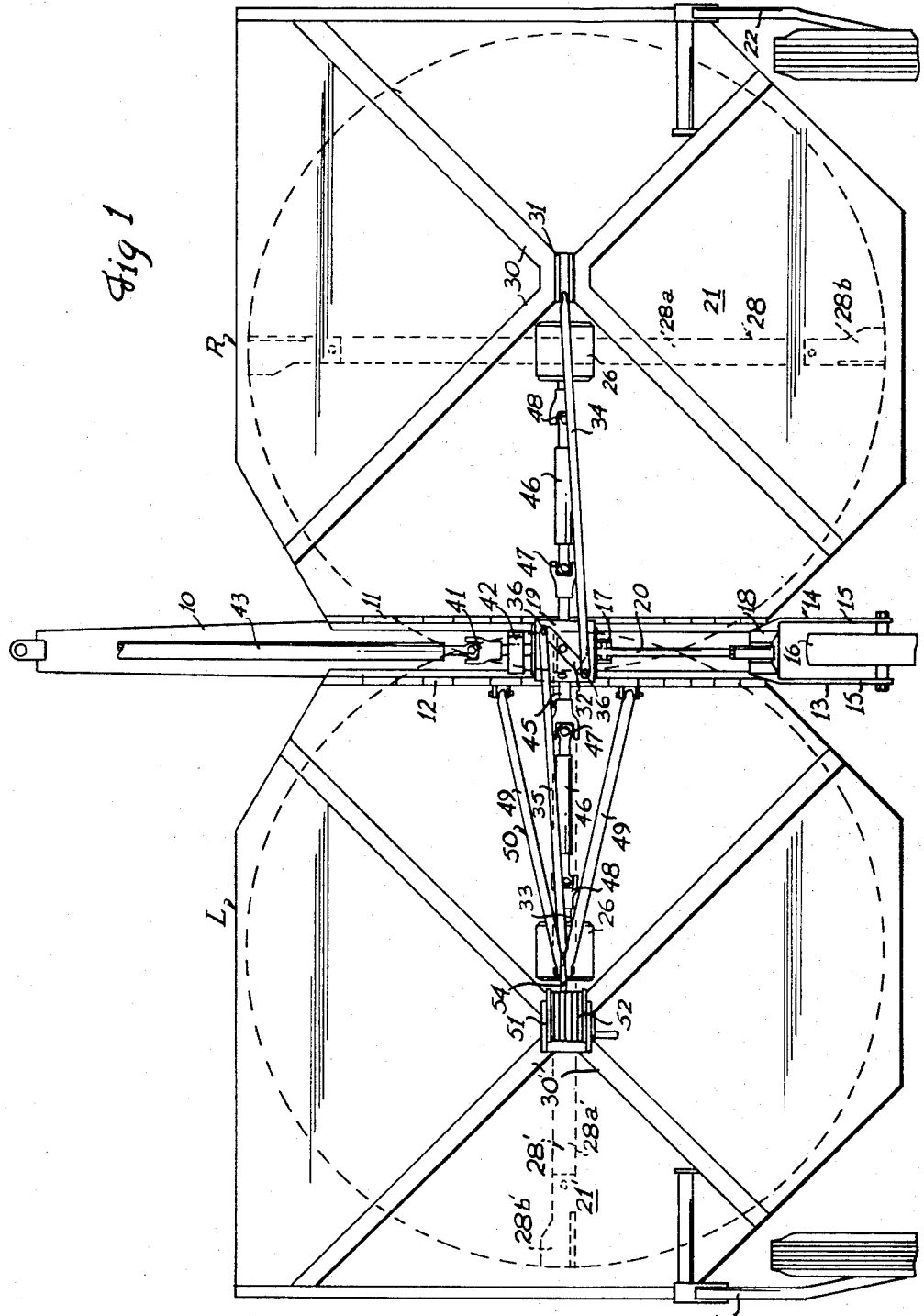
FIG. 1 is a top plan view of a rotary cutter embodying the invention.
Figure 2:
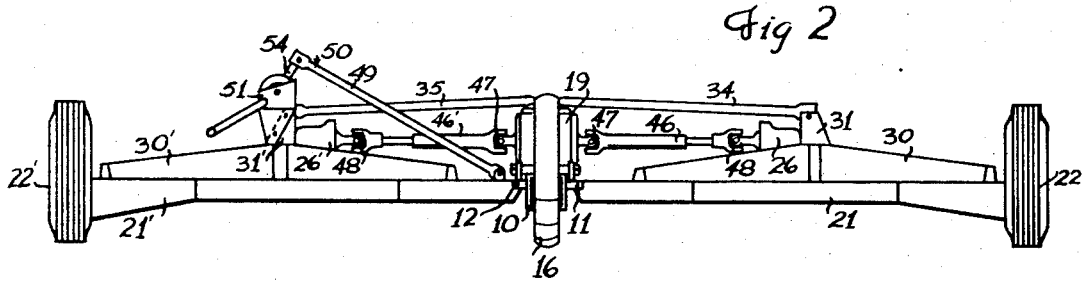
FIG. 2 is a rear elevational view of the rotary cutter shown in FIG. 1.
Figure 3:
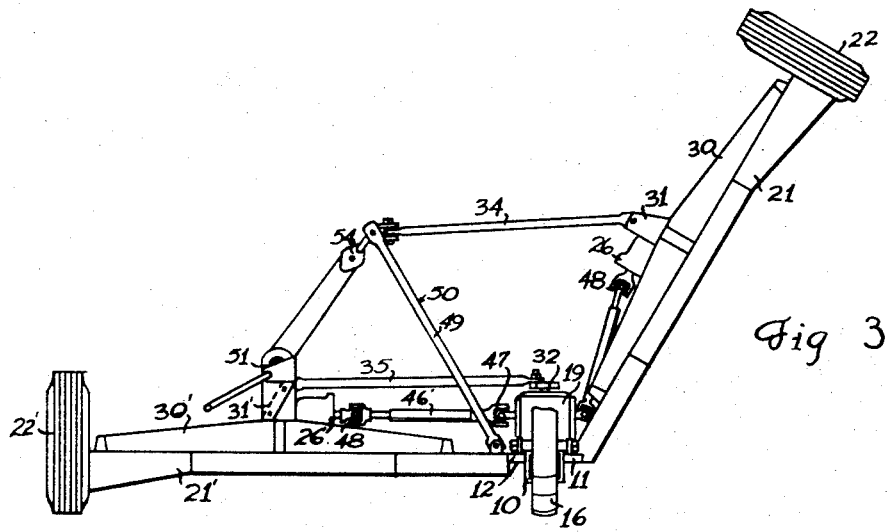
FIG. 3 is a rear elevational view of the rotary cutter of FIG. 1 showing one of the cutter sections raised in transporting position.
Figure 4:
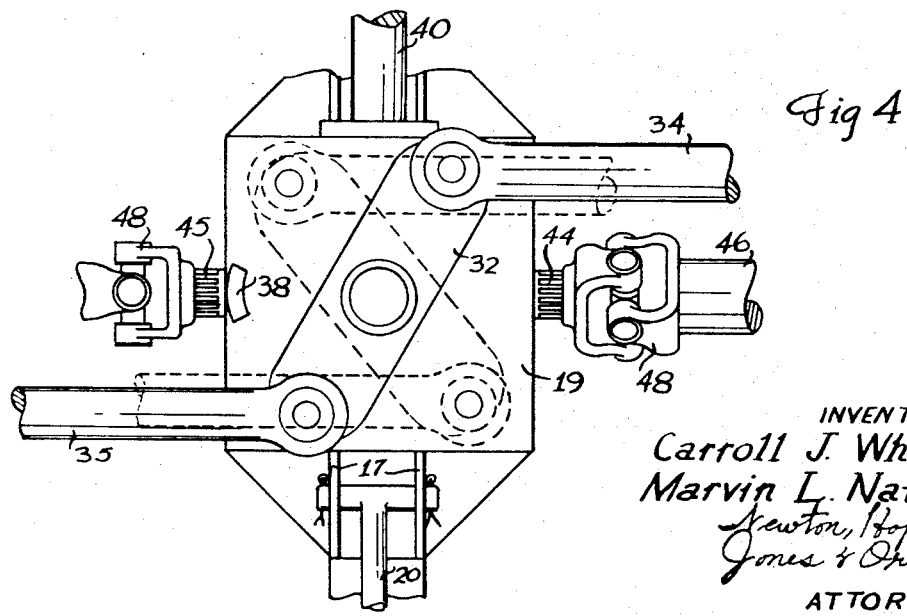
FIG. 4 is an enlarged partial top view of the transmission of the invention showing the crank assembly in alternate locations.

Referring to FIG. 1, it will be seen that the apparatus of the invention comprises generally a support beam 10, a right cutter section R and a left cutter section L. The right cutter section R is pivotally attached to the beam 10 at one side thereof and the left cutter section L is pivotally attached to the beam 10 opposite the right cutter section R.

The beam 10 is formed from a rectangular box beam and has a pivotal hitch (not shown) attached to one of its ends for pivotally connecting the rotary cutter to a vehicle (not shown) for towing the cutter. The pivotal hitch is of the universal type whereby the support beam can pivot about any axis about the vehicle. Extending along one side of the beam 10 from that end opposite that to which the hitch is attached is a right hinge 11 and extending along the opposite side of the beam 10 and parallel to the right hinge 11 is a left hinge 12.

Pivotally carried at the end of the beam 10 opposite that at which the hitch (not shown) is attached is a wheel support yoke 14. The yoke 14 comprises an upstanding arm 18 pivotally pinned at its lower end to the beam 10 and a U-shaped member 13 fixedly attached to and pivotal with the upstanding arm 18. The U-shaped member 13 has a pair of extending legs 15 which rotatably carry a support wheel 16 between the extending ends thereof. The yoke 14 is so located that the support wheel 16 is freely rotatable as it engages the ground when the cutter is towed by the vehicle (not shown).

Attached to the top of the beam 10 between the hinges 11 and 12 and approximately midway the length of the hinges 11 and 12 is a transmission 19. That side of the transmission 19 facing the yoke 14 is provided with a pair of supports 17 extending vertically along the side of the transmission 19 to pivotally engage one end of a conventional adjustment link 20, the other end of which is pivotally attached to the upper extending end of the arm 18 of the yoke 14. Therefore, it can easily be seen that adjusting the length of the link 20 in conventional manner varies the position of the wheel 16 so that the height of the beam 10 above the terrain is changed.

The right cutter section R comprises a metal cutter deck 21, an angle drive unit 26 mounted on the cutter deck 21, and a cutting blade 28. The deck 21 is attached to the hinge 11 at one side thereof so as to be pivotal with respect to the beam 10. Attached to and extending across the top of the deck 21 are a plurality of reinforcing beams 30 which add rigidity to the deck 21. The beams 30 are positioned so that they converge at a point just outboard of the center of the deck 21 and have extending upwardly from the junction thereof an alignment standard 31.

In conjunction with the hinge 11 a wheel and axle assembly 22 is provided at the outer extending edge of the deck 21 to determine the height of the deck above the terrain over which the rotary cutter is drawn. The wheel and axle assembly 22 is of conventional type used on towed rotary cutters where the axle is pivotally mounted on the cutter and has a conventional means for adjustably locating the axle in a plurality of angular positions with respect to the deck.

Substantially centered on the deck 21 just inwardly of the junction of the beams 30 is a conventional angle drive unit 26 having an input shaft 33 and an output shaft (not shown) located substantially at right angles to each other. The output shaft of the drive unit 26 extends below the top of the deck 21 and carries on the extending end thereof the cutter blade 28.

The cutting blade 28 is of conventional type having a central web 28a having its center attached to the end of the output shaft (not shown) and having cutters 28b pivotally attached to the extending ends thereof. As the web 28a is rotated by the drive unit 26, the cutters 28b extend under centrifugal force and cut any foliage with which they come into contact.

The left cutter section L is a mirror image of the right cutter section R, therefore, those components of the left cutter section L corresponding to those of the right cutter section R will be designated by the primes of the reference numbers indicated on the right cutter section R. It will also be noted that the cutting circles defined by the cutting blades 28 and 28′ overlap as they rotate so that the entire path between the outermost portions of the cutting circles defined by the cutting blades 28 and 28′ is cut.

Figure 6:
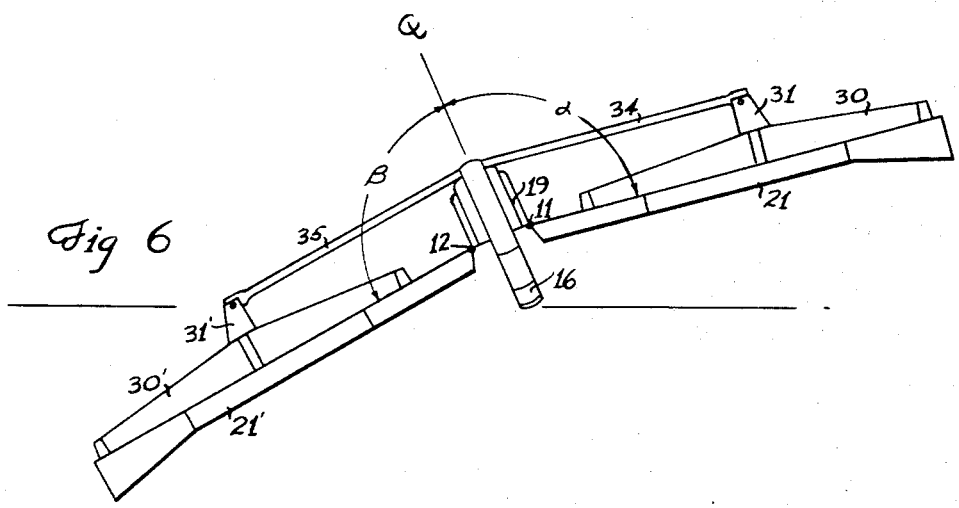
FIG. 6 is a schematic drawing showing the cutter sections of the rotary cutter of FIG. 1 in another alternate position.
Figure 5:
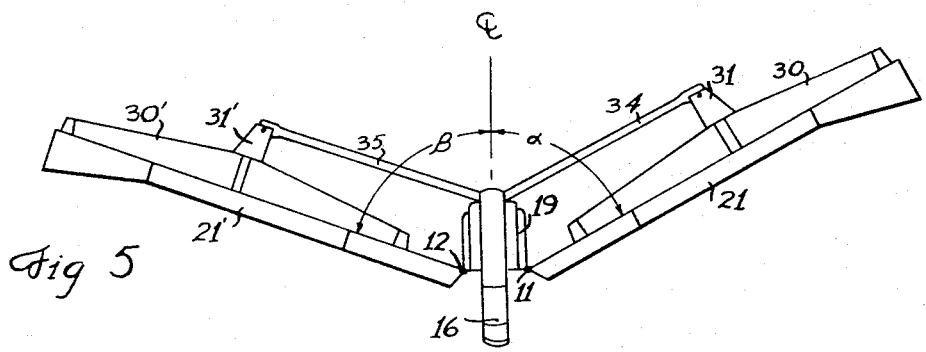
FIG. 5 is a schematic drawing showing the cutter sections of the rotary cutter of FIG. 1 in an alternate position.

Pivotally carried on the top of the transmission 19 is a crank link 32. The link 32 is pivoted to the transmission 19 at its center and has pivotally attached through a ball joint 36 to one extending end thereof a first positioning rod 34. Pivotally attached to the other extending end of the link 32 through a ball joint 36 is a second positioning rod 35. It will also be noted that the pivot ball joints 36 attached to the rods 34 and 35 are located equidistant from the center of the link 32 so that the rods 34 and 35 are forcibly moved equal amounts as the link 32 pivots. The first positioning rod 34 is pivotally pinned to the upper extending end of the alignment standard 31 of the right cutter section R and the second positioning rod 35 has its extending end pivotally pinned to the upper extending end of the alignment standard 31′ of the left cutter section L. Since this particular linkage arrangement requires that the distance between the upright alignment standards 31 and 31′ and the ball joints 36 of the link 32 always be equal, the angle subtended by the vertical centerline CL of the transmission 19 as it pivots about a longitudinal axis of the beam 10 and the deck 21 is always equal to the angle subtended by the vertical centerline CL of the transmission 19 and the deck 21 as shown in FIGS. 5 and 6. In order that the link 32 is precluded from pivoting to such an extent that the positioning rods 34 and 35 are locked in a position which will prevent the efficient operation of the rotary cutter, a stop lug 38 is provided on one side of the top of the transmission 19. The lug 38 is effective to contact and check the movement of the link 32 when a certain predetermined limit of movement is reached by the link 32.

The transmission 19 is of conventional type having an input shaft 40 and a single output shaft extending from either side of the transmission and terminating in output shafts 44 and 45. The input shaft 40 extends from that side of the transmission 19 facing the pivotal hitch (not shown) attached to the beam 10. The shaft 44 extends outwardly from the transmission 19 toward the right cutter section R and the shaft 45 extends from the transmission 19 oppositely to the shaft 44 and toward the left cutter section L. The shaft 40 is connected with shafts 44 and 45 and rotation of the input shaft 40 causes the shafts 44 and 45 to rotate in unison.

The input shaft 40 is connected to the power take-off (not shown) of the vehicle towing the rotary cutter so that the shaft 40 is rotated as the power take-off rotates. This connection is made through an extendable primary drive shaft 43 connected to the power take-off through a universal 41 at one end of the shaft 43 and to the input shaft 40 of the transmission 19 through another universal joint 41 and a drive connection 42. The drive connection 42 may be either a slip clutch, shear limiter, straight drive, or other device depending upon the particular requirements specified by the use of the rotary cutter. Therefore, it will be seen that the primary drive shaft 43 transmits the rotation of the power take-off to the input shaft 40 of the transmission 19 which is effective to rotate the output shafts 44 and 45.

The output shaft 44 is drivingly connected to the input shaft 33 of the angle drive unit 26 through an extendable secondary drive shaft 46. The drive shaft 46 is connected to the output shaft 44 by a universal joint 47 and to the input shaft 33 by another universal joint 48. Since the output shaft 44 is displaced from the hinge 11 about which the deck 21 pivots, the secondary drive shaft 46 must be extendable to compensate for the change in distance between the output shaft 44 and the input shaft 33 of the drive unit 26 as the deck 21 pivots and the universal joints 47 and 48 are necessary in order that the shafts 44, 46 and 33 pivot with respect to each other yet still drivingly engage each other.

Since the output shaft 45 drives the input shaft 33′ in the same manner as the shaft 44 drives the shaft 33, the drive gear connecting them is identical. The drive components connecting the shaft 45 and the shaft 33′, therefore, are designated by primes of the reference numbers designating the components connecting the shafts 44 and 33.

An A-frame 50 has the spaced ends of its legs 49 attached to the left cutter section L adjacent to hinge 12 of the support beam 10 on either side of the transmission 19 so that the extending end of the A-frame 50 defines an arcuate path in a plane perpendicular to the path of travel of the rotary cutter. The positioning rod 34 of the cutter section R may be easily detached from the end of the link 32 and pinned to the apex end of the A-frame 50 when pivoted about its legs to a vertical position. This serves to form a triangle with the deck 21 of the cutter section R so that the deck 21 and the remaining elements of the cutter section R may be raised when transporting the rotary cutter between cutting locations.

For pivoting the A-frame 50 when connected to the positioning rod 34, a conventional winch 51 is carried by the standard 31' on the deck 21'. The winch 51 has a cable 52 and pulley 54 attachable to the extending end of the A-frame 50 so that the right cutter section R may be easily raised for transporting the rotary cutter.

In operation, it will be seen that the rotary cutter is towed over terrain by the vehicle (not shown) and is supported by the wheel 16, the wheel and axle assemblies 22 and 22', and the vehicle while being towed. The power take-off of the vehicle (not shown) rotates the cutting blades 28 and 28' in opposite directions so that foliage growing on the terrain over which the rotary cutter is towed will be cut.

As the wheel 16 or the wheels of the wheel and axle assemblies 22 and 22' engage unlevel terrain, one of the cutter sections will tend to pivot about the beam 10 and the opposite cutter section. If cutter section R tends to pivot upwardly, its positioning rod 34 will move toward the transmission 19 to force the link 32 to pivot about its center pivot point. This causes the opposite end of the link to pivot and move the positioning rod 35 a distance corresponding to the movement of the positioning rod 34, whereby the cutter section L will be pivoted upwardly an angle equal to the angle cutter section R was pivoted. The transmission 19 and the beam 10 may be forced to pivot with respect to the towing vehicle by means of its pivotal hitch if the terrain is higher beneath one side of the rotary cutter, whereby the centerline or reference line CL, which is rotated about a longitudinal axis of the beam 10 and maintained at an angle that bisects the angle subtended by the decks 21 and 21'.

The opposed shaft angles formed between output shaft 44 and secondary drive shaft 46 and between output shaft 45 and secondary drive shaft 46' are always maintained equal to each other as a result of the centerline CL of the transmission 19 bisecting the angle subtended by the decks 21 and 21'. Furthermore, the angle formed between secondary drive shaft 46 and cutter input shaft 33 is always maintained equal to the angle formed between secondary drive shaft 46' and cutter input shaft 33'. It will also be noted that since the shaft angles of the universals 47 and 47' are always equal, and the shaft angles of the universals 48 and 48' are always equal, the shaft angles are minimized.

It is well known in the universal joint art that the relative speed between the input shaft and the output shaft of the universal joint fluctuates when the shaft angle is not 0°. It is also well known that the percentage of speed fluctuation between the input shaft and output shaft of a universal joint increases as an exponentially increasing function of shaft angle. Therefore, if the shaft angle is minimized, then the speed fluctuation will be minimized. This is one result of the present invention which serves to minimize wear and vibrations in the drive train.

It will, however, be noted that, since the shaft angles of the universal joints 47 and 47' connecting the output shafts 44 and 45 to the secondary drive shafts 46 and 46' are not 0°, there will be speed fluctuations between the output shafts 44 and 45 and the secondary drive shafts 46 and 46'. It is generally known, though, that the vibrations are caused, to a great extent, by the difference in speed fluctuations between the rotational speeds of the cutter blades. If, however, the shaft angles of the universals 47 and 47' are equal to each other and the shaft angles of universals 48 and 48' are equal to each other, the speed fluctuations of the cutter blades 28 and 28' occur at the same time. Therefore, even though there still may be fluctuations in the rotational speeds of the cutting blades 28, the relative fluctuations between cutting blades 28 are substantially eliminated.

The bisection of the angle subtended by the decks 21 and 21' by the centerline CL of the transmission 19 and beam 10 is best shown in FIGS. 5 and 6. FIG. 5 shows the decks 21 and 21' both elevated and FIG. 6 shows the deck 21 elevated and the deck 21' lowered.

What is claimed as invention is:

1. In a rotary cutter having a pair of cutter sections, cutting means mounted on each of said sections, and a support member pivotally connecting the cutter sections, drive means mounted on said support member and operatively connected to each of said cutting means and means for maintaining said support member in an equal angular relationship with respect to each of said cutter sections so as to maintain substantially equal rotational speeds of the cutting means.

2. A rotary cutter adapted to be towed behind a vehicle over terrain comprising:
   (1) a support member pivotal about a longitudinal axis and connectable to the vehicle, said member having means for maintaing said member a predetermined distance from said terrain, and having a reference line, said reference line pivoting about said longitudinal axis as said support member pivots thereabout;
   (2) a first cutter section having one side thereof pivotally connected to said support member and having means for maintaining the extending side thereof a predetermined distance above the terrain;
   (3) a second cutter section having one side thereof pivotally connected to said support member opposite to said first cutter section and having means for maintaining the extending side thereof a predetermined distance above the terrain; and,
   (4) linkage means also connecting said first cutter section to said support member and said second cutter section to said support member, said linkage means effective to maintain a predetermined relationship between said support member, said first cutter section and said second cutter section independently of the predetermined distance at which the support member and first and second cutter sections are maintained above the terrain.

3. The apparatus of claim 2 wherein said linkage means is effective to locate the support member with respect to said first and second cutter sections so that said reference line always bisects the angle subtended by said cutter sections.

4. The apparatus of claim 3 wherein said linkage means comprises:
   a first rod connected to said first cutter section;
   a second rod connected to said second cutter section; and
   crank means connecting said first and second rods and said support member, said crank means effective to locate the support member with respect to said first and second cutter sections so that said reference line always bisects the angle subtended by said cutter sections.

5. The apparatus of claim 4 wherein said crank means comprises a link pivotally connected at its center to said support member and pivotally connected at each end thereof to one of said rods.

6. In a rotary cutter adapted to be towed behind a vehicle, said cutter having pivotal cutter sections, a drive unit rotatably driving the cutting blade associated with each of the cutter sections, and drive means having adjustable length drive shafts and universal joints therein for driving the cutting blades through the drive units; and means for maintaining the length of said drive shafts substantially equal at all times.

7. The apparatus of claim 6 wherein said means comprises a linkage mechanism connecting the pivotal cutter sections and effective to maintain minimum shaft angle in the universal joints at any particular position of the cutter sections.

8. The apparatus of claim 6 wherein said means is effective to maintain equal shaft angles in the opposed universal joints.

9. The apparatus of claim 8 wherein said means is effective to maintain substantially equal rotational speeds of the cutting blades.

10. The apparatus set forth in claim 5 having a transmission mounted onto said support member between said cutter sections, an angle drive unit mounted on each of said cutter sections, each of said drive units having an output shaft rotatably extending through said cutter section, a cutting blade carried by each of said output shafts, and drive means connecting said transmission and said angle drive units, said drive means effective to rotate said cutting blades in response to rotation of said input means, each of said drive means having a universal joint therein, and said linkage means effective to minimize the shaft angles of said universal joints.

References Cited

UNITED STATES PATENTS

| | | | |
|---|---|---|---|
| 1,939,830 | 12/1933 | Paul | 280—459 |
| 2,325,252 | 7/1943 | Krenzke | 56—7 |
| 3,038,286 | 6/1962 | Hall | 56—7 |
| 3,115,738 | 12/1963 | Engler | 56—6 |
| 3,237,388 | 3/1966 | Rishovd et al. | 56—25 X |
| 3,267,652 | 8/1966 | Dahlgren et al. | 56—6 |
| 3,329,225 | 7/1967 | Dunn | 56—25.4 |

ALDRICH F. MEDBERY, *Primary Examiner.*

U.S. Cl. X.R.

56—25.4